United States Patent
Hopt et al.

(10) Patent No.: US 6,752,314 B2
(45) Date of Patent: Jun. 22, 2004

(54) CARD READER INCLUDING/HAVING A PARTICULAR CARD STOP

(75) Inventors: Karl-Rudolf Hopt, Rottweil (DE); Jurgen Hopt, Rottweil (DE); Mike Franzmann, Hausen (DE); Michael Storz, Konstanz (DE)

(73) Assignee: ddm hopt & schuler GmbH & Co. KG (DE)

( * ) Notice: Subject to any disclaimer, the term of this patent is extended or adjusted under 35 U.S.C. 154(b) by 106 days.

(21) Appl. No.: 10/061,387

(22) Filed: Feb. 1, 2002

(65) Prior Publication Data

US 2003/0146279 A1 Aug. 7, 2003

(51) Int. Cl.⁷ .............................. G06K 7/00
(52) U.S. Cl. .................. 235/439; 235/384; 235/453
(58) Field of Search .................. 235/439, 384, 235/453

(56) References Cited

U.S. PATENT DOCUMENTS

| | | | | |
|---|---|---|---|---|
| 3,850,299 A | * | 11/1974 | Kreitzer | 209/569 |
| 3,909,595 A | * | 9/1975 | Morello et al. | 235/435 |
| 4,358,103 A | * | 11/1982 | Koike et al. | 271/248 |
| 4,527,052 A | * | 7/1985 | Kilborn | 235/485 |
| 5,017,764 A | * | 5/1991 | Hashimoto et al. | 235/454 |
| 5,045,674 A | * | 9/1991 | Mita et al. | 235/439 |
| 5,286,957 A | | 2/1994 | Defrasne | |
| 5,466,914 A | * | 11/1995 | Kitahara | 235/483 |
| 5,508,501 A | | 4/1996 | Fujimoto et al. | |

* cited by examiner

*Primary Examiner*—Michael G. Lee
*Assistant Examiner*—Kimberly D. Nguyen
(74) *Attorney, Agent, or Firm*—Walter A. Hackler

(57) ABSTRACT

In a card reader comprising a card stop 4 for a card 2 inserted into the card reader, the card stop 4 is rotatable out of the card path about an axis of rotation 6 extending transverse to the card path, and is rotatably coupled to an arm 9 which is deflectable about an axis of rotation 8 extending transverse to the card path and is pretensioned into a pivoting position engaging in the card path in the card inserting direction 3 behind the card stop 4. Insertion of a card deflects the arm against the action of a restoring force from the card path thereby also turning the card stop out of the card path. If a card of insufficient length is stuck in the card reader, it is pushed further by the inserted card and passes the deflected, i.e. effectless, card stop and is discharged from the card reader.

16 Claims, 7 Drawing Sheets

CARD READER INCLUDING/HAVING A PARTICULAR CARD STOP

BACKGROUND OF THE INVENTION

The invention concerns a card reader comprising a card stop for a card which is inserted into the card reader.

With so-called push/pull card readers, a user inserts a card into the card reader until it abuts a card stop in the data exchange position, and removes it from the card reader after data exchange. The length of cards comprising an integrated circuit (chip cards) or a magnetic strip (magnetic cards) is standardized. Card readers are therefore designed merely for this "standardized" card length. If a shorter card is introduced into the card reader to vandalize or manipulate the card reader, it gets stuck in the card reader thereby blocking introduction of a further card or impairing data exchange.

It is therefore the underlying object of the invention to effectively prevent blockage of a card reader of the above-mentioned type due to a shorter card.

SUMMARY OF THE INVENTION

This object is achieved in accordance with the invention in that the card stop is rotatable out of the card path about an axis of rotation extending transverse to the card path, and is rotatably coupled to an arm which can be deflected about an axis of rotation extending transverse to the card path and which is pretensioned in a pivoting position which engages in the card path behind the card stop in the card inserting direction.

The advantage achieved by the invention consists in that the insertion of a card deflects the arm out of the card path against the effect of a restoring force thereby also turning the card stop out of the card path. If a card of insufficient length is stuck in the card reader and a further card is inserted, the first is pushed further and past the removed, i.e. ineffective, card stop out of the card reader. The card stop becomes effective again only when the deflected arm can engage again in the card path. The distance between card stop and the arm pretensioned into the card path, corresponds to the standardized card length such that the card stop becomes again effective for a card with standardized card length as soon as it has pushed the card with insufficient length out of the card reader. This ensures that the card reader is neither blocked nor damaged by a card of half the size.

In particular advantageous embodiments of the invention, the deflectable arm is formed by the first arm of a two-armed lever whose second arm is rotatably coupled to the card stop. In this connection, the second arm of the two-armed lever can be pivoted at the card stop at a radial distance from its axis of rotation.

In particularly preferred embodiments of the invention, the card stop is formed by a bolt comprising a recess in the card plane. For example, the bolt can be round, in particular circular, and the recess can have the shape of a segment, in particular the segment of a circle or semi-circle.

The deflectable arm preferably has a rising slope extending in and/or against the card inserting direction at an angle to the center of the card path onto which an inserted card runs thereby deflecting the arm out of the card path. The rounded corners of standardized cards form a rising slope due to their curvature and therefore the deflectable arm must not necessarily have such a rising slope. Preferably, the rising slope is provided on a nose of the deflectable arm which engages in the card path.

To safely separate a card which is stuck in the card reader from a newly inserted card, the card stop has a separating edge on its side which pivots into the card path. This separating edge of the card stop starts engagement into the card path between the two cards when the deflected arm starts engagement behind the newly introduced card at the end of the inserting motion.

The deflectable arm is preferably pretensioned into its pivoting position engaging in the card path by means of a tension spring whose other end engages the housing of the card reader.

To keep the card in the card reader during data exchange, the arm which engages behind the card can be used as a lock.

Further advantages of the invention can be extracted from the description and the drawing. The features mentioned above and below can be used in accordance with the invention either individually or collectively in any arbitrary combination. The embodiment shown and described is not to be understood as exhaustive enumeration but rather has exemplary character for describing the invention.

BRIEF DESCRIPTION OF THE PREFERRED EMBODIMENT

Figure 1:
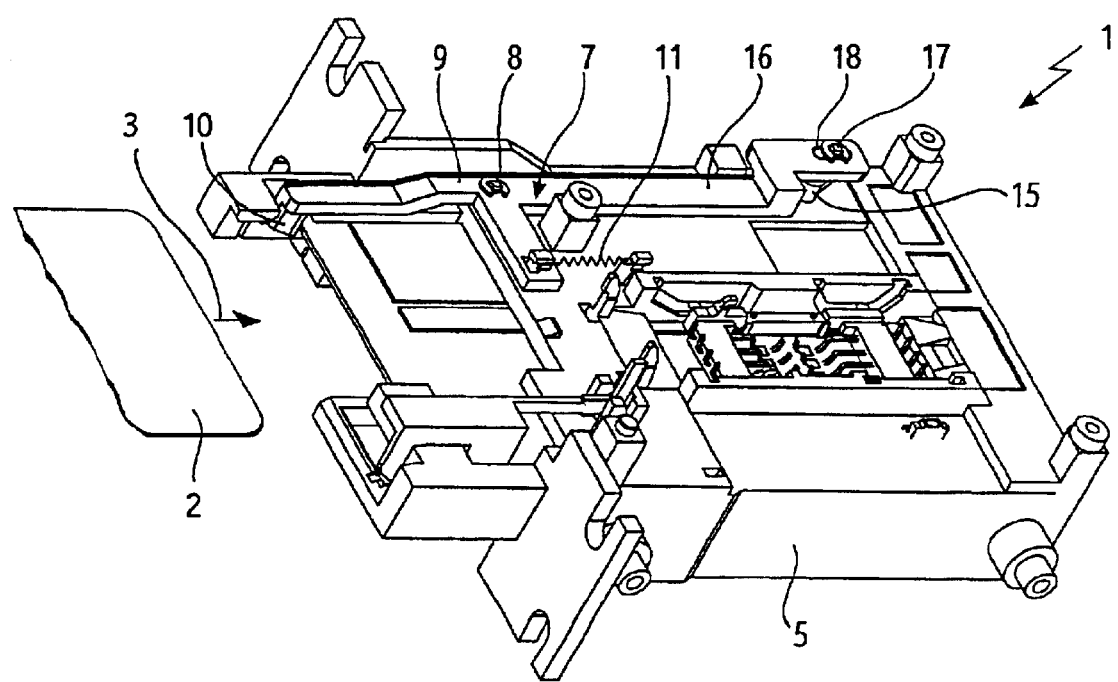
FIG. 1 shows a perspective view of the upper side of a card reader in accordance with the invention, comprising a card stop for a card inserted into the card reader.

Reference numeral 1 in FIG. 1 designates a so-called push/pull card reader wherein the user inserts a card 2 in the inserting direction 3 until it abuts a card stop 4 (FIG. 2) in the data exchange position in the card reader 1, and removes it from the card reader 1 after the data exchange.

The card stop 4 is rotatable in the card reader housing 5 about an axis of rotation 6 (FIG. 2), extending at a right angle to the card path, out of the card path, wherein this rotary motion of the card stop 4 is controlled by a two-armed lever 7. The two-armed lever 7 is pivotably disposed on the side of the card path in the housing 5 about an axis of rotation 8 extending at a right angle to the card path, and comprises a nose 10 at its rear arm 9 viewed in the inserting direction 3. The nose 10 engages in the card path when the card 2 is not inserted into the card reader 1. In this initial position engaging in the card path, the two-armed lever 7 is pretensioned by a tension spring 11 whose other end is supported on the housing 5.

In the embodiment of FIG. 2, the card stop 4 is formed by a round bolt 12 which has a semi-circular recess 13 in the card plane. The outer peripheral surface 14 of the bolt 12, which has a semi-cylindrical shape in the card plane, forms the stop surface for the card. Depending on the rotary position of the bolt 12, either the peripheral surface 14 or the recess 13 is disposed in the card path. An arm 15 projects radially from the bolt 12 which is hinged to the front arm 16 of the two-armed lever 7, viewed in the inserting direction 3. Towards this end, the free end of the radially projecting arm 15 is provided with a journal 17 which is disposed in an elongate hole 18 of the front arm 16 such that it can be rotated and displaced in the longitudinal direction.

Figure 2A:
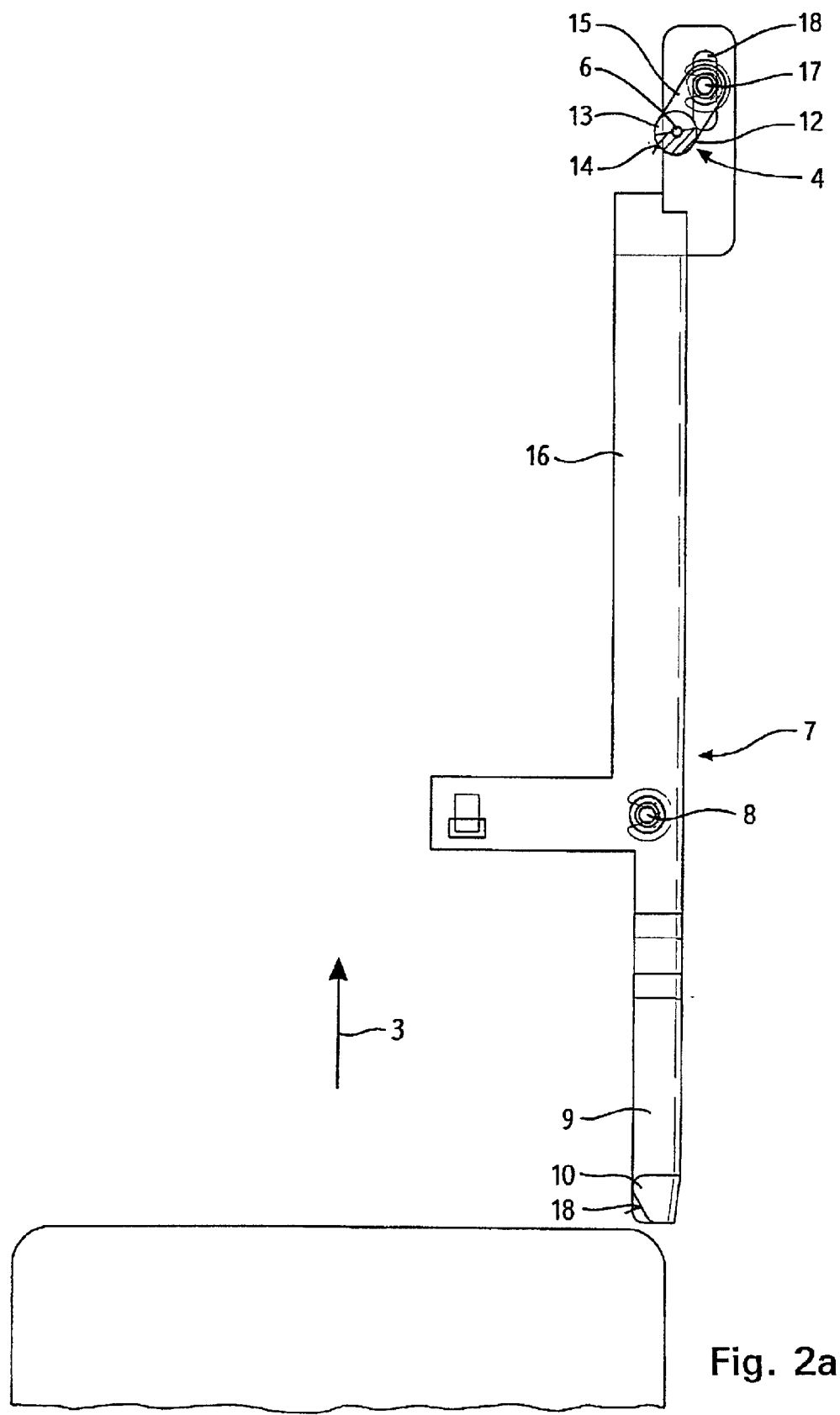
FIGS. 2a–2c schematically show different positions of the card stop of the inventive card reader when the card has not yet been inserted (FIG. 2a), when the card has been inserted partly (FIG. 2b) and when the card has been completely inserted (FIG. 2c)
Figure 2B:
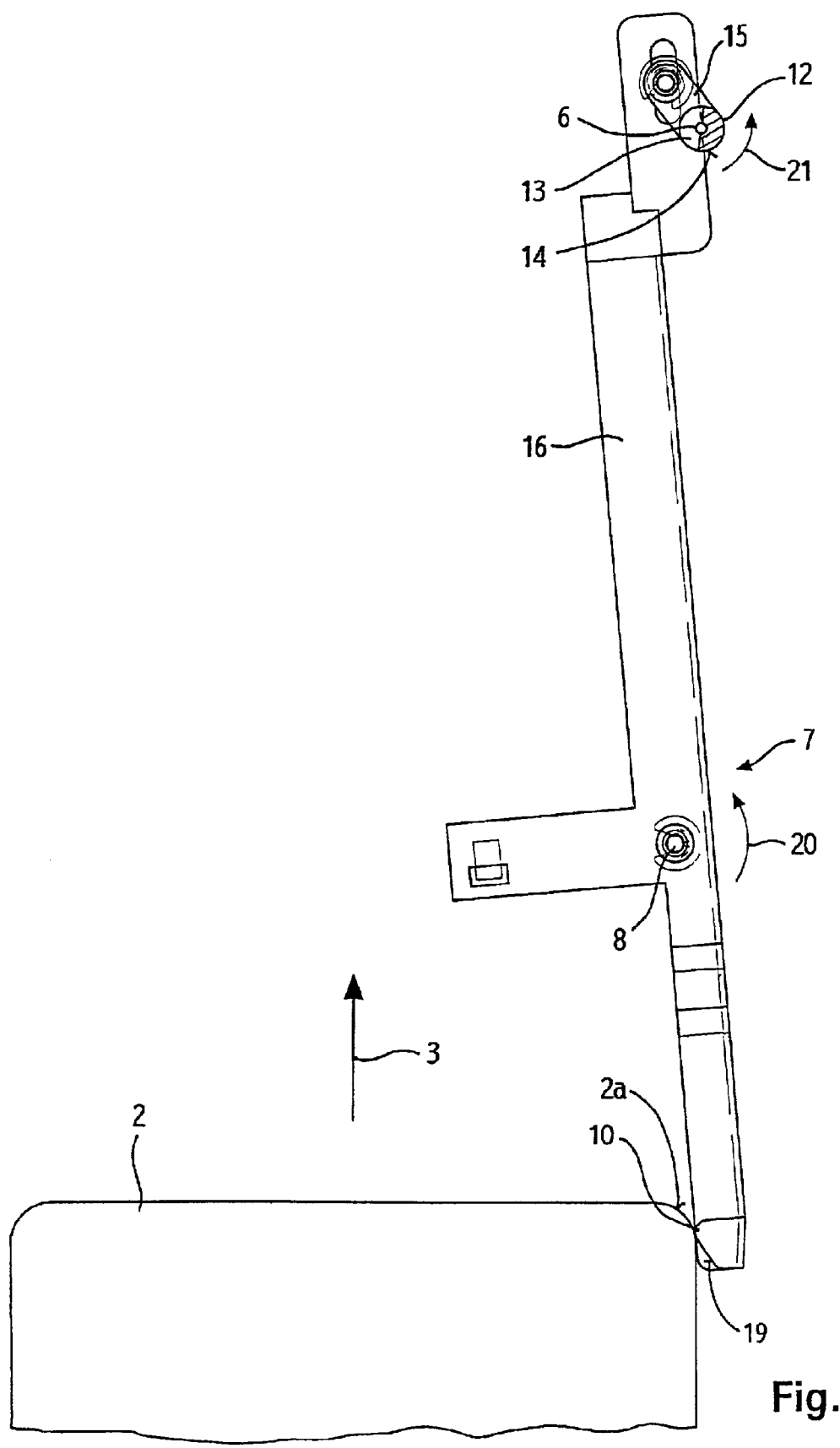
Figure 2C:
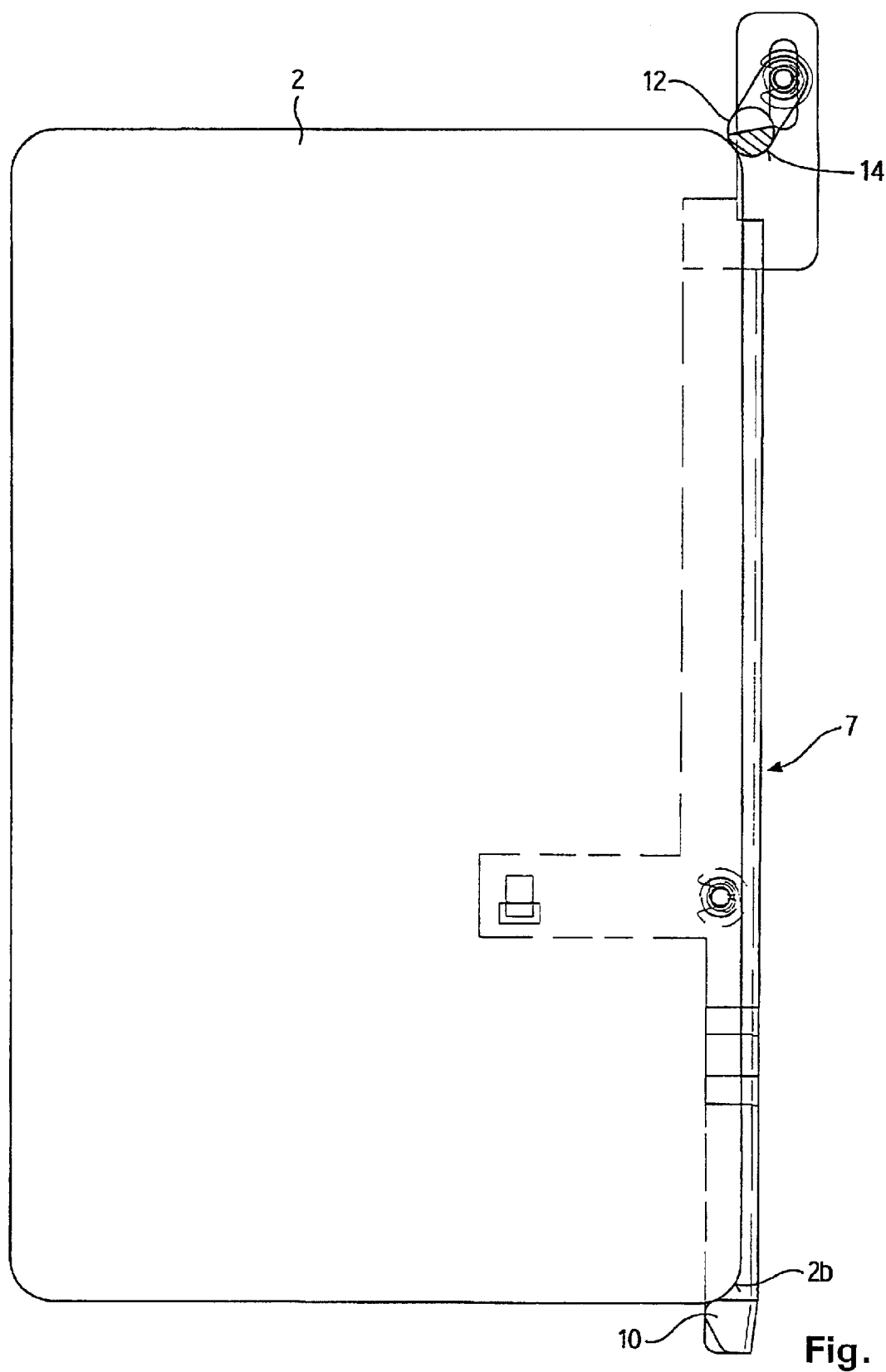

FIGS. 2a through 2c shows the function of the card reader 1 when a card 2 is inserted.

When the card 2 has not yet been inserted into the card reader 1, the nose 10 of the two-armed lever 7 and the semi-cylindrical peripheral surface 14 of the bolt 12 engage in the card path (FIG. 2a). When the card 2 is inserted in the inserting direction 3, the front rounded corner 2a of the card 2 runs onto the nose 10 or onto a rising slope 19 of the nose 10 which extends at an angle to the center of the card path in the inserting direction 3. This deflects the two-armed lever 7 against the spring force of the tension spring 11 about the axis of rotation 8 in the direction of arrow 20 and also the bolt 12 is turned in the same direction (direction of arrow 21) about the axis of rotation 6 by approximately 90° via the radially projecting arm 15 which is hinged to the front arm 16 (FIG. 2b). In this rotary position of the bolt 12, the recess 13 is disposed in the card path such that the outer peripheral surface 14 is completely turned out of the card path. The two-armed lever 7 remains deflected by the card 2 until during further insertion, driven by the tension spring 11, the nose 10 of the two-armed lever 7 starts to pivot behind the card 2 in the region of its rear rounded corner 2b against the direction of arrow 20. At the same time, the semi-cylindrical peripheral surface 14 of the bolt 12 starts to rotate into the card path. When the nose 10 of the two-armed lever 7 finally completely engages behind the card 2 in the inserting direction 3, also the semi-cylindrical peripheral surface 14 is completely turned into the card path. In the final position, shown in FIG. 2c, the card 2 abuts the semi-cylindrical peripheral surface 14 and cannot be pushed any further. Removal of the card 2 is, however, possible without any problems since the nose 10 is deflected out of the card path by the rear card end or the rear rounded corner 2b.

Figure 3A:
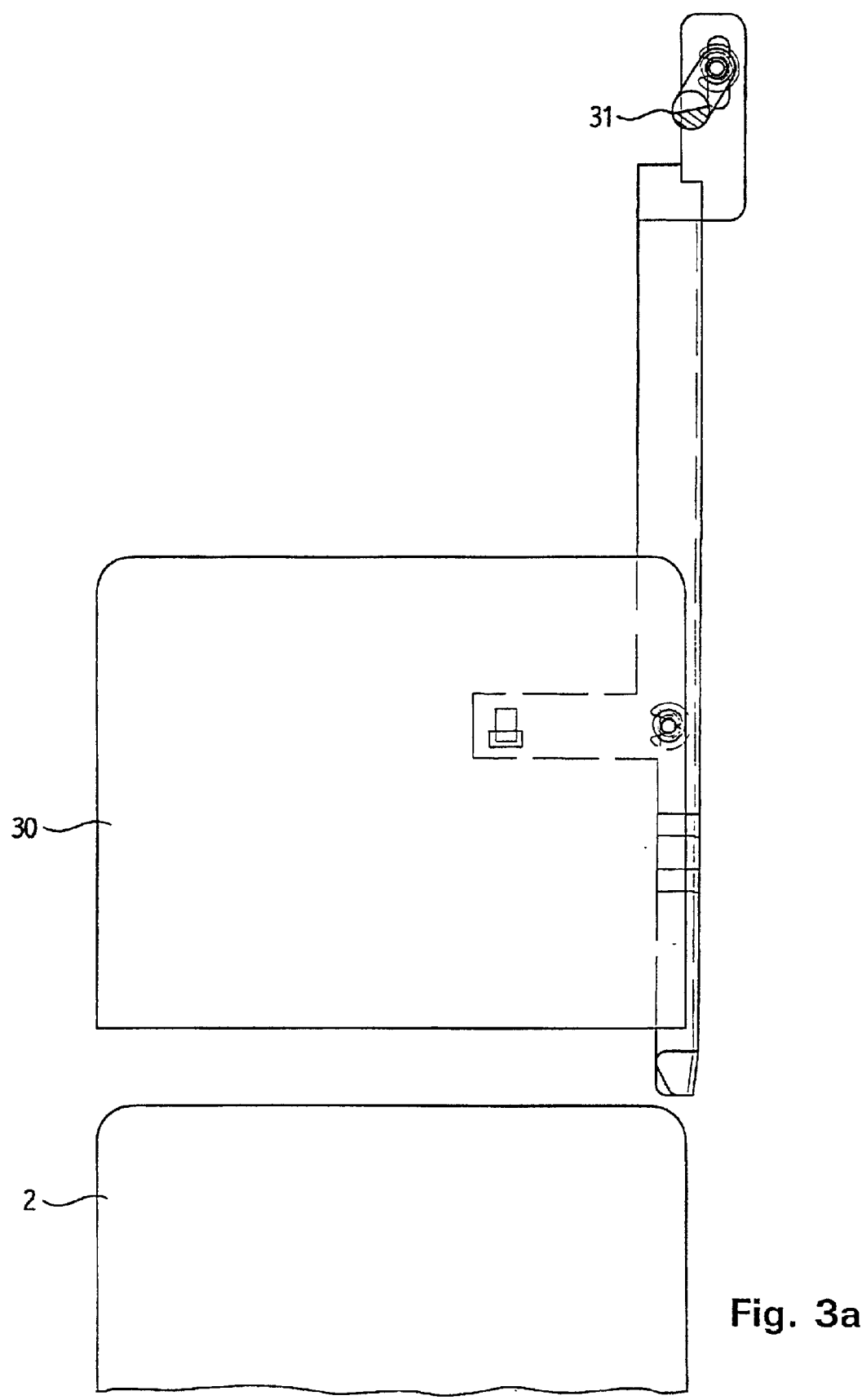
FIGS. 3a–3c schematically show different positions of the card stop of the inventive card reader when the card has not yet been inserted (FIG. 3a), when the card has been inserted partly (FIG. 3b) and when the card has been almost completely inserted (FIG. 3c), if a card of half the size has been previously inserted.
Figure 3B:
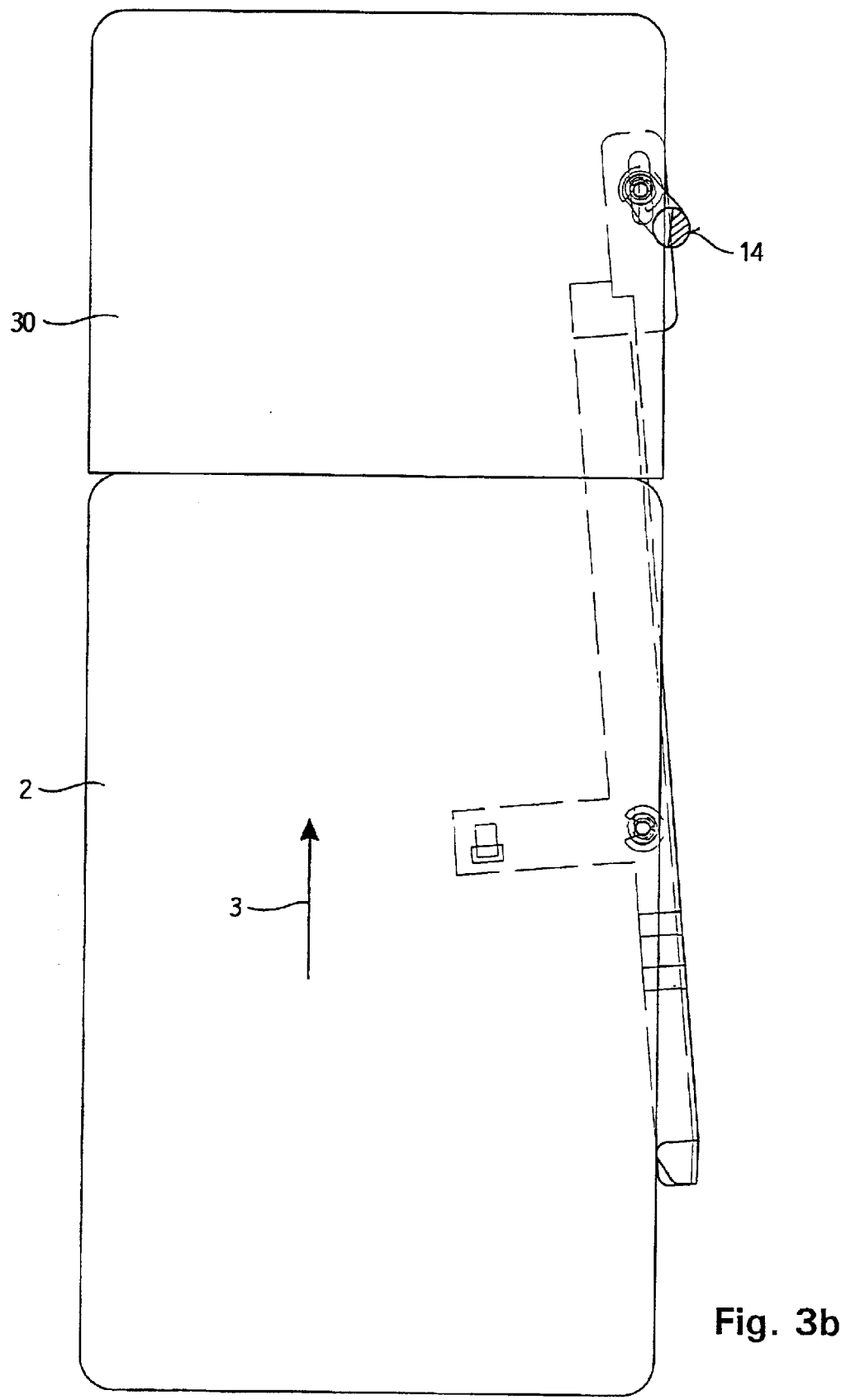
Figure 3C:
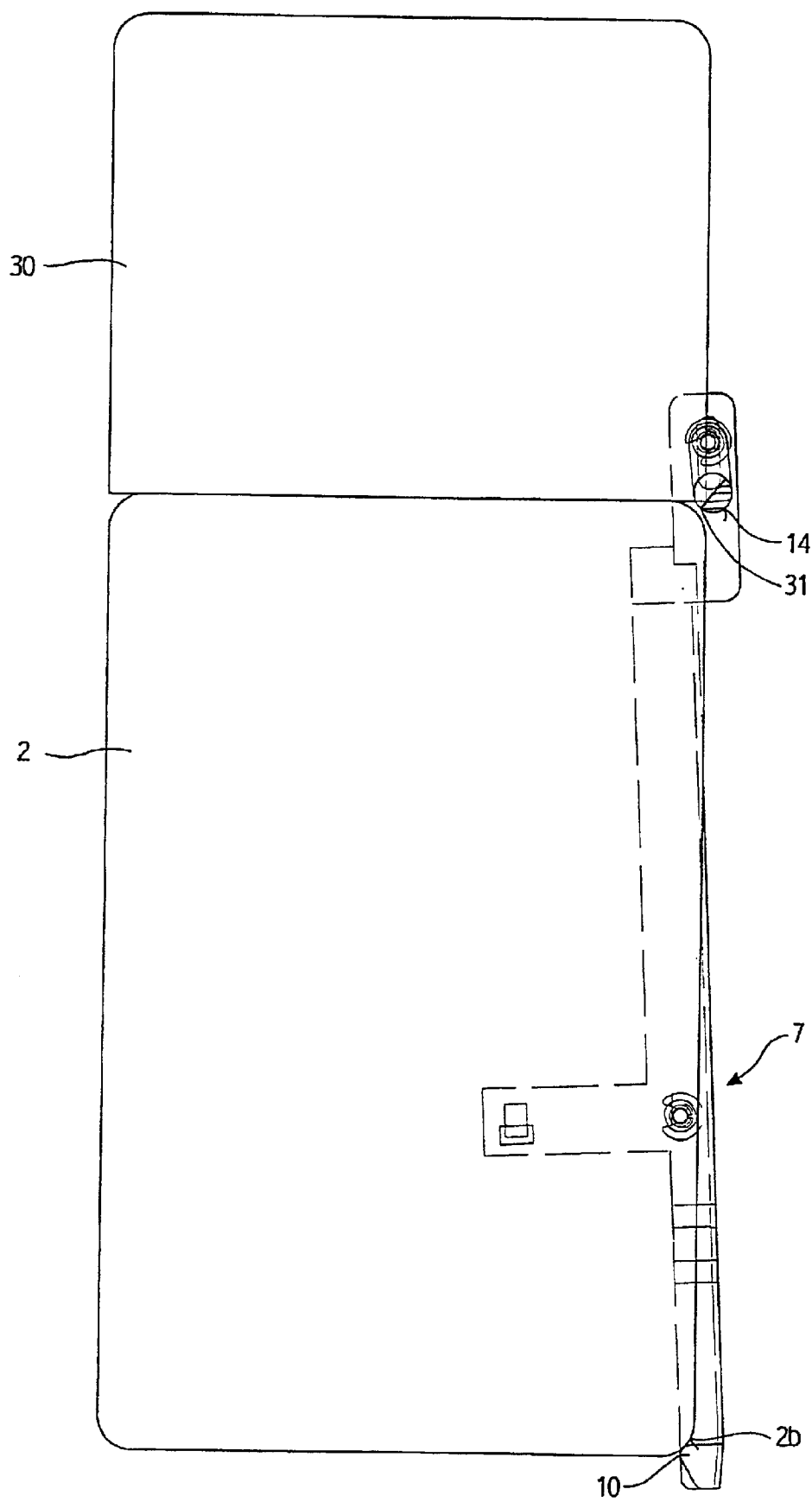

FIG. 3 shows the function of the card reader 1 when inserting a card 2 with previously inserted half-size card 30 (FIG. 3a). Insertion of a normal card 2 turns the semi-cylindrical peripheral surface 14 out of the card path, as described above, and the card 2 pushes the half-sized card 30 from behind in the inserting direction 3 and past the turned-out semi-cylindrical peripheral surface 14 (FIG. 3b) until the half-sized card 30 is discharged at the back of the card reader 1. This ensures that the half-sized card 30 does not block nor damage the card reader 1. The semi-cylindrical peripheral surface 14 starts to turn into the card path between the two cards 2, 30 only when the nose 10 of the two-armed lever 7 starts pivoting behind the card 2 in the region of its rear rounded corner 2b (FIG. 3c). To safely separate the two abutting cards 2, 30, the card stop 4 is provided with a separating edge 31 on its side pivoting into the card path. With this separating edge 31, the card stop 4 starts engagement in the card path between the two cards 2, 30 when the rear arm 9 starts engagement behind the inserted card 2.

The distance between card stop 4 and the rear arm 9 engaging in the card path corresponds to the standardized card length such that the card stop 4 is again effective for a card 2 having standard length as soon as it has pushed a shorter card from behind out of the card reader.

We claim:

1. Card stop apparatus for a card reader, said card stop apparatus comprising:
    a card stop disposed in a path of a card inserted into said card reader, said card stop being rotatable out of the card path about an axis of rotation extending transverse to a plane of the inserted card,
    an arm, rotatably coupled to said card stop, said arm being deflectable about an axis of rotation extending transverse to a plane of the inserted card, and behind said card stop in a card inserting direction, said arm being pretensioned into a pivoting position engaging the card path;
    wherein said card stop is formed as a bolt having a recess disposed in the card path; and wherein said bolt is generally round and the recess comprises a circle segment.

2. Card stop apparatus according to claim 1 wherein the deflectable arm is formed by a first arm of a two-armed lever with a second arm of the lever being rotatably coupled to said card stop.

3. Card stop apparatus according to claim 2 wherein the second arm is hinged to said card stop at a radial distance from the arm axis of rotation.

4. Card stop apparatus according to claim 1 wherein the deflectable arm includes a slope portion extending into the card path at an angle to the card path.

5. Card stop apparatus according to claim 1 wherein a nose of the deflectable arm engages the card path.

6. Card stop apparatus according to claim 1 wherein said card stop comprises a separating edge on a side pivoting into the card path.

7. Card stop apparatus according to claim 1 further comprising a tension spring for pretensioning the arm, the spring being interconnected between the arm and a card reader housing.

8. Card stop apparatus according to claim 1 wherein the deflectable arm is formed by a first arm a two-armed lever with a second arm of the lever being rotatably coupled to said card stop, the second arm is hinged to said card stop at a radial distance from the arm axis of rotation, said stop is formed or a bolt having a recess disposed in the card path, said bolt is generally round and the recess comprise a circle segment, the deflectable arm includes a slope pattern extending into the card path at an angle to the card path, a nose of the deflectable arm engages the card path, the card stop comprises a separating edge on a side pivoting in the card path and a tension spring pretensions the arm, the spring being interconnected below the arm and a card reader housing.

9. Card stop apparatus for a card reader said card stop apparatus comprising:
    a card stop disposed in a path of q card inserted into said card reader, said card stop being rotatable out of the card path about an axis of rotation extending transverse to the card path;
    an arm rotatably coupled to said card stop about an axis of rotation extending transverse to card path and disposed behind the card stop in a card inserting direction, wherein, when the card has not yet been inserted into the card reader, the arm and the card stop engage in the card path and wherein insertion of a card pivots the arm out of the card path against an effect of a restoring force thereby rotating the card stop out the card path.

10. Card stop apparatus according to claim 9 wherein the deflectable arm is formed by a first arm of a two-armed lever with a second an-n of the lever being rotatably coupled to said card stop.

11. Card stop apparatus according claim 10 wherein the second arm is hinged to a said card stop at a radial distance from the an-n axis of rotation.

12. Card stop according to claim 9 where the deflectable arm includes a slope portion extending into the card path at an angle to the card path.

13. Card stop apparatus according to claim 9 wherein a nose of the deflectable arm engages the card path.

14. Card stop apparatus according to claim 9 wherein said card stop comprises a separating edge on a side pivoting into the card path.

15. Card stop apparatus according claim 9 further comprises a tension spring for pretensioning the arm, the spring being interconnected between the arm and a card reader housing.

16. Card stop apparatus according to claim 9 wherein the deflectable arm is formed by a first arm of a two-armed lever with a second arm of the lever being rotatably coupled to said card stop, the second arm is hinged to said card stop at a radial distance from the arm axis of rotation, said stop is formed or a bolt having a recess disposed in the card path, the deflectable arm includes a slope portion extending into the card path at an angle to the card path, a nose of the deflectable arm engages the card path, the card stop comprises a separation edge on a side pivoting in the card path and a tension spring pretensions the arm, the spring being interconnected between the arm and a card reader housing.

* * * * *

UNITED STATES PATENT AND TRADEMARK OFFICE
CERTIFICATE OF CORRECTION

PATENT NO. : 6,752,314 B2
DATED : June 22, 2004
INVENTOR(S) : Karl-Rudolf Hopt et al.

It is certified that error appears in the above-identified patent and that said Letters Patent is hereby corrected as shown below:

<u>Title page,</u>
Add Item:

-- [30]     Foreign Application Priority Data

Feb. 9, 2001         (EPO)          01 103 027.7 --

Signed and Sealed this

Thirtieth Day of November, 2004

JON W. DUDAS
*Director of the United States Patent and Trademark Office*